US009600316B2

(12) United States Patent
Dournov et al.

(10) Patent No.: US 9,600,316 B2
(45) Date of Patent: Mar. 21, 2017

(54) AUGMENTED ALLOCATION OF VIRTUAL MACHINES FOR APPLICATION

(71) Applicant: Microsoft Technology Licensing, LLC, Redmond, WA (US)

(72) Inventors: Pavel A. Dournov, Sammamish, WA (US); Denis Samoylov, San Jose, CA (US); Anil Ingle, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 518 days.

(21) Appl. No.: 13/654,062

(22) Filed: Oct. 17, 2012

(65) Prior Publication Data

US 2014/0109088 A1    Apr. 17, 2014

(51) Int. Cl.
    *G06F 9/455*          (2006.01)
    *G06F 9/445*          (2006.01)

(52) U.S. Cl.
    CPC ...... *G06F 9/45558* (2013.01); *G06F 9/44505* (2013.01); *G06F 8/61* (2013.01); *G06F 9/45533* (2013.01); *G06F 2009/4557* (2013.01); *G06F 2009/45575* (2013.01)

(58) Field of Classification Search
    CPC .................................................. G06F 9/44504
    USPC ........................................... 718/1, 102, 104
    See application file for complete search history.

(56) References Cited

U.S. PATENT DOCUMENTS

| | | | | |
|---|---|---|---|---|
| 4,949,254 A * | 8/1990 | Shorter | ...................... | G06F 9/54 709/226 |
| 5,201,049 A * | 4/1993 | Shorter | ................. | G06F 9/5033 718/1 |
| 7,577,722 B1 * | 8/2009 | Khandekar | ......... | G06F 9/45558 709/220 |
| 7,716,667 B2 | 5/2010 | Van Rietschote et al. | | |
| 7,840,839 B2 | 11/2010 | Scales et al. | | |
| 8,001,247 B2 | 8/2011 | Salevan et al. | | |

(Continued)

FOREIGN PATENT DOCUMENTS

EP          2043320          4/2009

OTHER PUBLICATIONS

Chappell, D. "The windows azure programming model". 2010. David-Chappel & Associates, Tech. Rep.*

(Continued)

*Primary Examiner* — Lewis A Bullock, Jr.
*Assistant Examiner* — Gilles Kepnang
(74) *Attorney, Agent, or Firm* — Workman Nydegger

(57) ABSTRACT

The starting up of an application involving multiple virtual machines by overallocating virtual machines. In response to a request to allocate a certain number of virtual machines corresponding to the application, an augmented number of virtual machines is determined to be allocated in response to the request. The augmented number includes both the initially requested number of virtual machines in addition to a surplus number of virtual machines. The virtual machines are then initiated to start up if they are not already started up. Before all of the virtual machines are started up, code is bound to the virtual machines. Thus, because more virtual machines were initiated startup than are required for the application, the code may be bound to some of the virtual machines in the application before all of the virtual machine have started up.

19 Claims, 4 Drawing Sheets

(56) References Cited

U.S. PATENT DOCUMENTS

| | | | |
|---|---|---|---|
| 8,141,090 B1* | 3/2012 | Graupner | G06F 9/45558 709/225 |
| 8,156,516 B2 | 4/2012 | McClain et al. | |
| 8,286,174 B1* | 10/2012 | Schmidt et al. | 718/104 |
| 8,307,362 B1* | 11/2012 | Gong et al. | 718/1 |
| 8,359,594 B1* | 1/2013 | Davidson | G06F 9/5077 709/218 |
| 8,443,365 B2* | 5/2013 | Kumar | G06F 9/45558 714/1 |
| 8,683,464 B2 | 3/2014 | Rozee et al. | |
| 8,752,047 B2* | 6/2014 | Banga | G06F 9/5077 718/1 |
| 8,756,696 B1* | 6/2014 | Miller | H04L 63/14 709/247 |
| 8,856,785 B2* | 10/2014 | Gimpl | G06F 8/63 718/1 |
| 8,959,523 B2* | 2/2015 | Patil | G06F 9/45558 709/220 |
| 9,244,705 B1* | 1/2016 | Bondalapati | G06F 9/45504 |
| 2006/0184935 A1 | 8/2006 | Abels et al. | |
| 2006/0184936 A1 | 8/2006 | Abels et al. | |
| 2006/0184937 A1 | 8/2006 | Abels et al. | |
| 2007/0288224 A1* | 12/2007 | Sundarrajan et al. | 703/22 |
| 2008/0104608 A1* | 5/2008 | Hyser et al. | 718/105 |
| 2008/0126834 A1 | 5/2008 | Sankaran | |
| 2008/0155223 A1 | 6/2008 | Hiltgen | |
| 2008/0163171 A1 | 7/2008 | Chess et al. | |
| 2008/0163194 A1 | 7/2008 | Dias et al. | |
| 2008/0201709 A1 | 8/2008 | Hodges | |
| 2008/0201711 A1* | 8/2008 | Amir Husain | 718/1 |
| 2008/0222234 A1 | 9/2008 | Marchand | |
| 2008/0244575 A1* | 10/2008 | Carter | G06F 9/45558 718/1 |
| 2008/0244579 A1 | 10/2008 | Muller | |
| 2009/0006534 A1 | 1/2009 | Fries | |
| 2009/0204961 A1 | 8/2009 | DeHaan et al. | |
| 2009/0210873 A1* | 8/2009 | Cuomo et al. | 718/1 |
| 2009/0260007 A1 | 10/2009 | Beaty et al. | |
| 2009/0282404 A1* | 11/2009 | Khandekar et al. | 718/1 |
| 2010/0057913 A1 | 3/2010 | DeHaan | |
| 2010/0058342 A1* | 3/2010 | Machida | G06F 9/5077 718/1 |
| 2010/0313200 A1* | 12/2010 | Rozee et al. | 718/1 |
| 2011/0029970 A1* | 2/2011 | Arasaratnam | G06F 9/45558 718/1 |
| 2011/0197188 A1* | 8/2011 | Srinivasan | G06F 8/60 718/1 |
| 2011/0252420 A1* | 10/2011 | Tung | G06F 9/5072 718/1 |
| 2012/0072914 A1* | 3/2012 | Ota | G06F 9/5022 718/100 |
| 2012/0096457 A1* | 4/2012 | Gupta et al. | 718/1 |
| 2012/0266168 A1* | 10/2012 | Spivak | G06F 9/5055 718/1 |
| 2012/0284708 A1* | 11/2012 | Anderson et al. | 718/1 |
| 2012/0331463 A1* | 12/2012 | Orveillon | G06F 8/63 718/1 |
| 2013/0055241 A1* | 2/2013 | De | G06F 9/45533 718/1 |
| 2013/0139152 A1* | 5/2013 | Chang | G06F 9/45545 718/1 |
| 2013/0326496 A1* | 12/2013 | De | G06F 9/45558 717/174 |
| 2014/0068602 A1* | 3/2014 | Gember | G06F 9/45558 718/1 |

OTHER PUBLICATIONS

De, Pradipta, et al. "Caching vm instances for fast vm provisioning: a comparative evaluation." Aug. 2012. Euro-Par 2012 Parallel Processing. Springer Berlin Heidelberg, pp. 325-336.*

MHR. "2.1 Two-Term and Three-Term Ratios", retrieved from website link for R.E. Mountain Middle School, <http://www2.sd35.bc.ca/teachers/dponak/Ponaks_Math/8_Chapter_2.html>. Published in 2011.*

VMware, Inc. "VMware vCloud Director 1.5 Evaluation Guide". Latest Revision in Nov. 2011. VMware Technical Whitepapers. All Pages, retrieved from link for Technical Whitepapers, <http://www.vmware.com/files/pdf/techpaper/VMW-vCloud-Director1_5-EvalGuide.pdf>.*

"Virtual Machine: Policy Engine", Retrieved on: Jul. 25, 2012, Available at: http://www.websandbox.org/documentation/vm_rules.aspx.

Grit, et al., "Virtual Machine Hosting for Networked Clusters: Building the Foundations for Autonomic Orchestration", In Proceedings of Workshop on Virtualization Technology in Distributed Computing, Nov. 17, 2006, 8 pages.

"Cisco Virtualized Multi-Tenant Data Center Services At-A-Glance", Retrieved on: Jul. 25, 2012, Available at: http://www.cisco.com/en/US/docs/solutions/Enterprise/Data_Center/VMDC/2.6/vmdcservicesaag.html.

Cole, Colin S., "Migrating Financial Services Applications to the Azure Public Cloud", Published on: Mar. 7, 2011, Available at: http://blogs.msdn.com/b/businesstalk/archive/2011/03/07/migrating-financial-services-application-to-the-azure-public-cloud.aspx.

Vanover, Rick, "Configure a Hyper-V VM for Automatic Startup", Published on: Feb. 20, 2012, Available at: http://www.techrepublic.com/blog/networking/configure-a-hyper-v-vm-for-automatic-startup/5302.

"12.3.2. Cluster Policy", Retrieved on: Jul. 25, 2012, Available at: https://access.redhat.com/knowledge/docs/en-US/Red_Hat_Enterprise_Virtualization/3.0/html/Administration_Guide/Tasks_RHEV_Migration_Configuring_Cluster_Policy.html.

"Automate Provisioning to Help Optimize Data Center Resources and Reduce Complexity in the Virtual Environment", Sep. 2007, pp. 1-4. Available at <<ftp://ftp.software.ibm.com/software/tivoli/solutionsheets/TIS10433-USEN-00.pdf>>.

"Automatic Virtual Machine Provisioning", 2009, pp. 1-2. (The month of Publication is irrelevant since the year of Publication is clearly prior to the filing of the Application) Available at <<http://www.priorartdatabase.com/IPCOM/000128928/>>.

Strachan, "Using WDS and Hyper-V for Virtual Machine Host Deployment", Feb. 2009, pp. 1-8. Available at <<https://technet.microsoft.com/en-us/magazine/2009.02.hyperv.aspx>>.

"System Center Virtual Machine Manager Product Overview", 2009, pp. 1-8. (The month of Publication is irrelevant since the year of Publication is clearly prior to the filing of the Application) Available at <<http://www.diraction.ch/shopdocs/files/System%20Center%20Virtual%20Machine%20Manager%20Product%20Overview.pdf>>.

"Virtual Server Features", 2009, (The month of Publication is irrelevant since the year of Publication is clearly prior to the filing of the Application) Available at <<http://technet.microsoft.com/en-us/library/cc720335.aspx>>.

U.S. Appl. No. 12/478,612, Mar. 1, 2012, Office Action.
U.S. Appl. No. 12/478,612, Jul. 18, 2012, Office Action.
U.S. Appl. No. 12/478,612, Nov. 7, 2013, Notice of Allowance.

* cited by examiner

AUGMENTED ALLOCATION OF VIRTUAL MACHINES FOR APPLICATION

BACKGROUND

A virtual machine is code that hosts an operating system and potentially a set of one or more applications as well. The virtual machine executes in an environment provided by a host operating system on a host computing system (the "host").

In operation, the virtual machine generates images and/or rendering instructions representing the user interface (such as a desktop or application user interface) to be rendered on the client, and causes the host to transmit the same to the client. The client receives the image and/or rendering instructions, and renders the user interface accordingly. The client also receives user input and transmits the same to the host. The virtual machine processes the input and changes the virtual machine state. If such change in state causes a change to the user interface, the changes are transmitted to the client for further rendering. This process repeats rather quickly, and the response time is sufficiently fast, that the user of the client might not be even able to distinguish whether the operating system and perhaps the associated applications are operated on the client or via virtual machine.

Alternatively, virtual machines may virtualize a computing system that does not include a user interface, in which case there is no such rendering of a user interface. For instance, virtual machines may represent computing nodes in a distributed application. In that case, a number of virtual machines may each represent computing nodes that each perform a certain role in the distributed application.

A host computing system (also referred to as a "host") is typically capable of running a number of virtual machines. The host typically ensures isolation between the virtual machines. Each host has a hypervisor that uses underlying physical resources (such as network bandwidth, storage, memory, processing) to provide the appearance to the virtual machine as though the virtual machine has dedicated physical resources. This appearance is referred to as a virtual resource. Thus, each virtual machine may have virtual hard drives, virtual processors, virtual network bandwidth, virtual RAM and so forth.

BRIEF SUMMARY

At least one embodiment described herein relates to the starting up of an application involving multiple virtual machines. In response to a request to allocate a certain number of virtual machines corresponding to the application, an augmented number of virtual machines is determined to be prepared in response to the request. The augmented number includes both the initially requested number of virtual machines in addition to a surplus number of virtual machines. The augmented number of virtual machines are then caused to initiate startup. If there are already one or more virtual machines available for allocation, then the number of virtual machines to be started up may be offset by the number of virtual machines already started up.

As the virtual machines are started up, code is bound to the virtual machines. For instance, this code may be the customer code whereas the virtual machine is just a container or environment in which that customer code executes. Thus, because more virtual machines were initiated at startup, than are required for the application, the application code may be bound to all of the virtual machines in the application before all of the virtual machines have started up. This allows the application to be started up much more predictably as it is often the final few virtual machines that end up taking much longer than the mean (due to hardware and/or software flaws). The excess virtual machines may be allocated to other applications to fulfill subsequent requests.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the overallocating of virtual machines for an application is described. In response to a request to allocate a certain number of virtual machines corresponding to the application, an augmented number of virtual machines is determined to be allocated in response to the request. The augmented number includes both the initially requested number of virtual machines in addition to a surplus number of virtual machines. The virtual machines are then caused to initiate startup if they are not already started up. Before all of the virtual machines are started up, and potentially as the virtual machines are started up, application code is bound to the virtual machines. Thus, because more virtual machines were initiated startup than are required for the application, the code may be bound to all of the virtual machines in the application before all of the virtual machine have started up. This result in much more predictable, and sometimes faster startup, of the application as a whole. The surplus virtual machines may be used for future application requests.

The binding may be performed first for virtual machines that are to perform more critical roles in the application. Furthermore, the amount of surplus virtual machines to be started up may be dependent upon the importance of the role to be played by the virtual machines.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
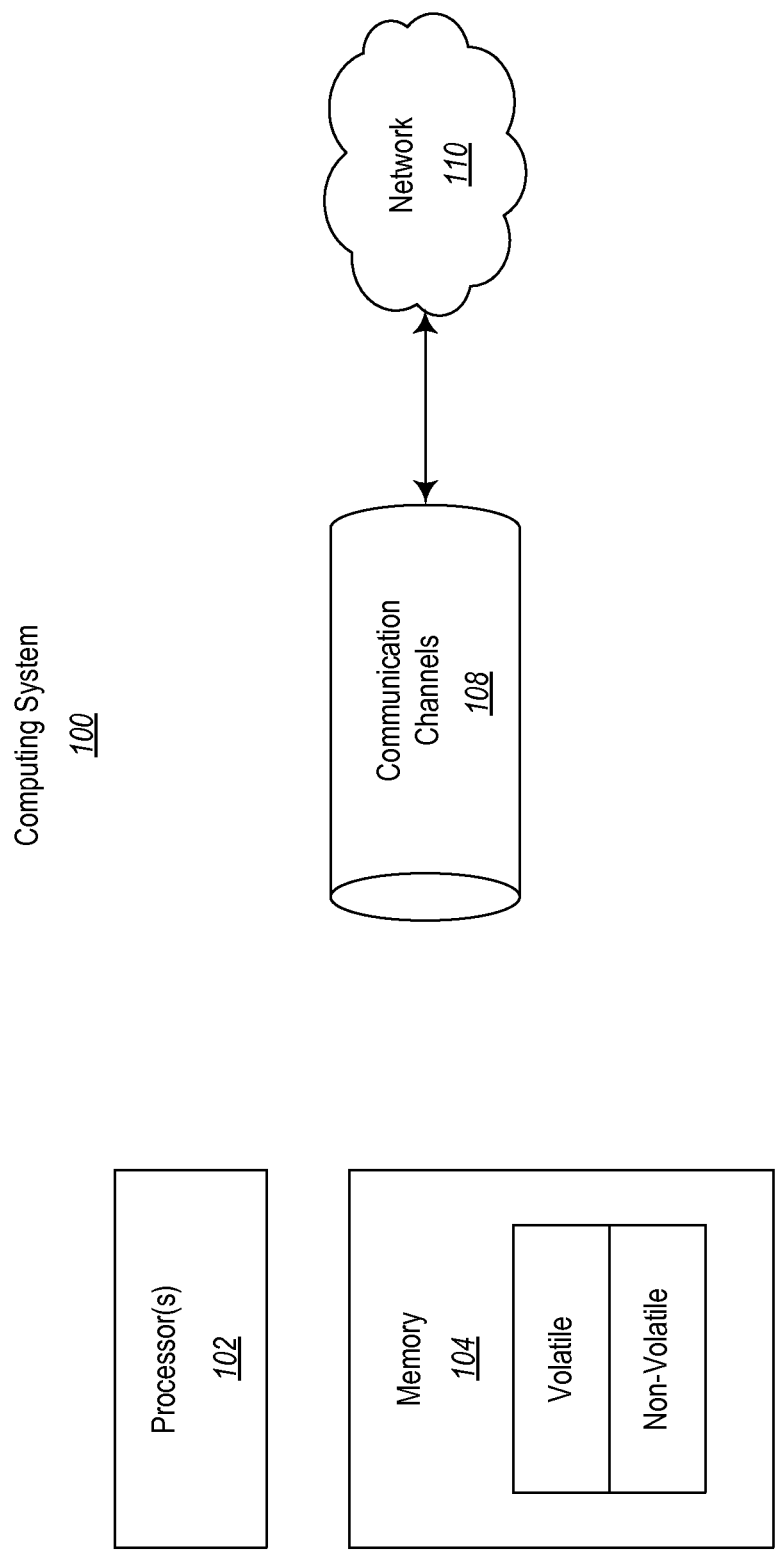
FIG. 1 abstractly illustrates a physical computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
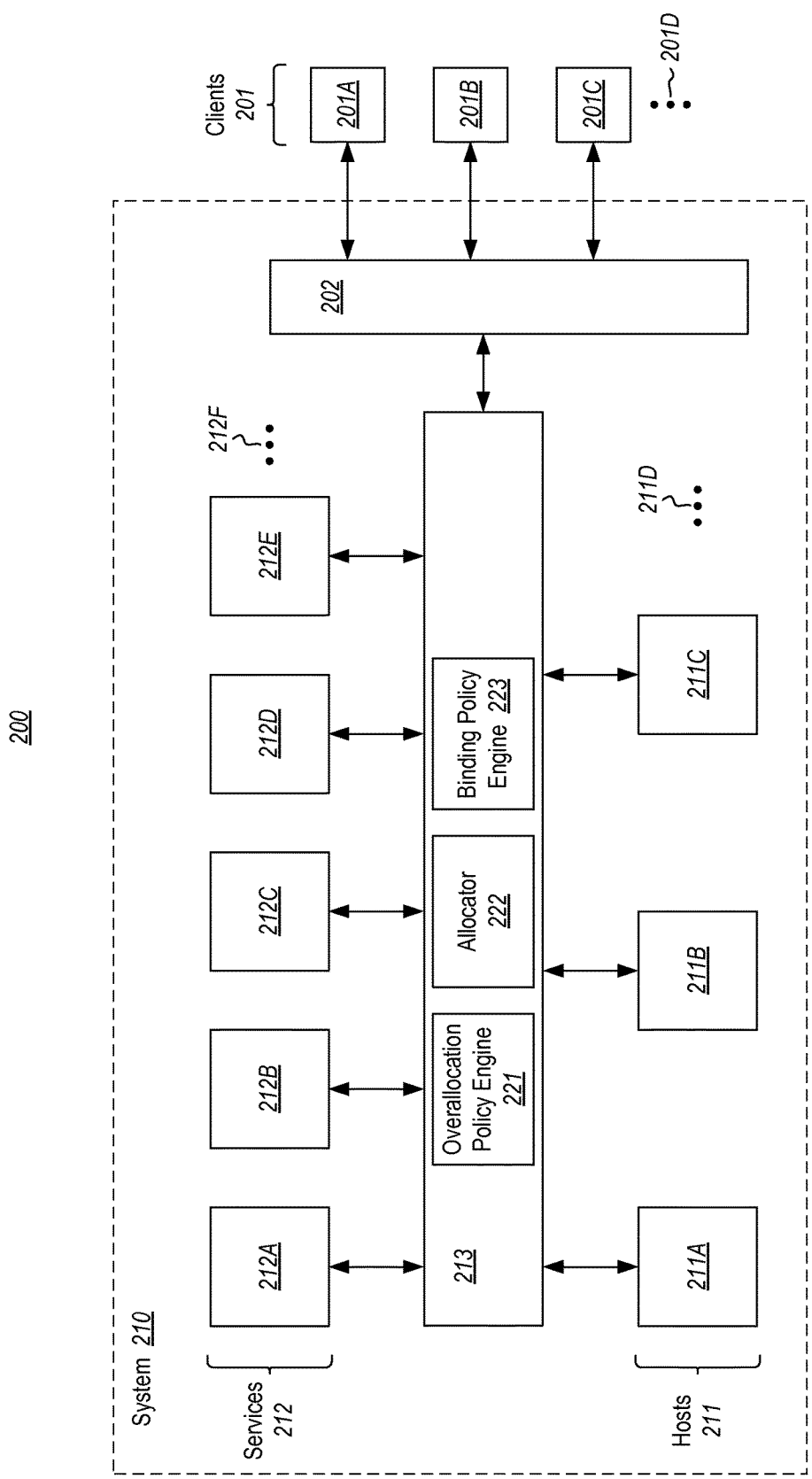
FIG. 2 abstractly illustrates a datacenter environment in which the principles described herein may be employed. The environment includes multiple clients interacting with a system that includes multiple hosts and multiple services.

FIG. 2 abstractly illustrates an environment 200 in which the principles described herein may be employed. The environment 200 includes multiple clients 201 interacting with a system 210 using an interface 202. The environment 200 is illustrated as having three clients 201A, 201B and 201C, although the ellipses 201D represent that the principles described herein are not limited to the number of clients interfacing with the system 210 through the interface 202. The system 210 may provide services to the clients 201 on-demand and thus the number of clients 201 receiving services from the system 210 may vary over time.

Each client 201 may, for example, be structured as described above for the computing system 100 of FIG. 1. Alternatively or in addition, the client may be an application or other software module that interfaces with the system 210 through the interface 202. The interface 202 may be an application program interface that is defined in such a way that any computing system or software entity that is capable of using the application program interface may communicate with the system 210.

The system 210 may be a distributed system, although not required. In one embodiment, the system 210 is a cloud computing environment. Cloud computing environments may be distributed, although not required, and may even be distributed internationally and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The system 210 includes multiple host computing systems 211 (also referred to hereinafter as simply "hosts"), that are each capable of running virtual machines. Although the system 200 might include any number of hosts 211, there are three hosts 211A, 211B and 211C illustrated in FIG. 2, with the ellipses 211D representing that the principles described herein are not limited to the exact number of hosts that are within the system 210. There may be as few as one, with no upper limit. Furthermore, the number of hosts may be static, or might dynamically change over time as new hosts are added to the system 210, or as hosts are dropped from the system 210. Each of the hosts 211 may be structured as described above for the computing system 100 of FIG. 1.

Figure 3:
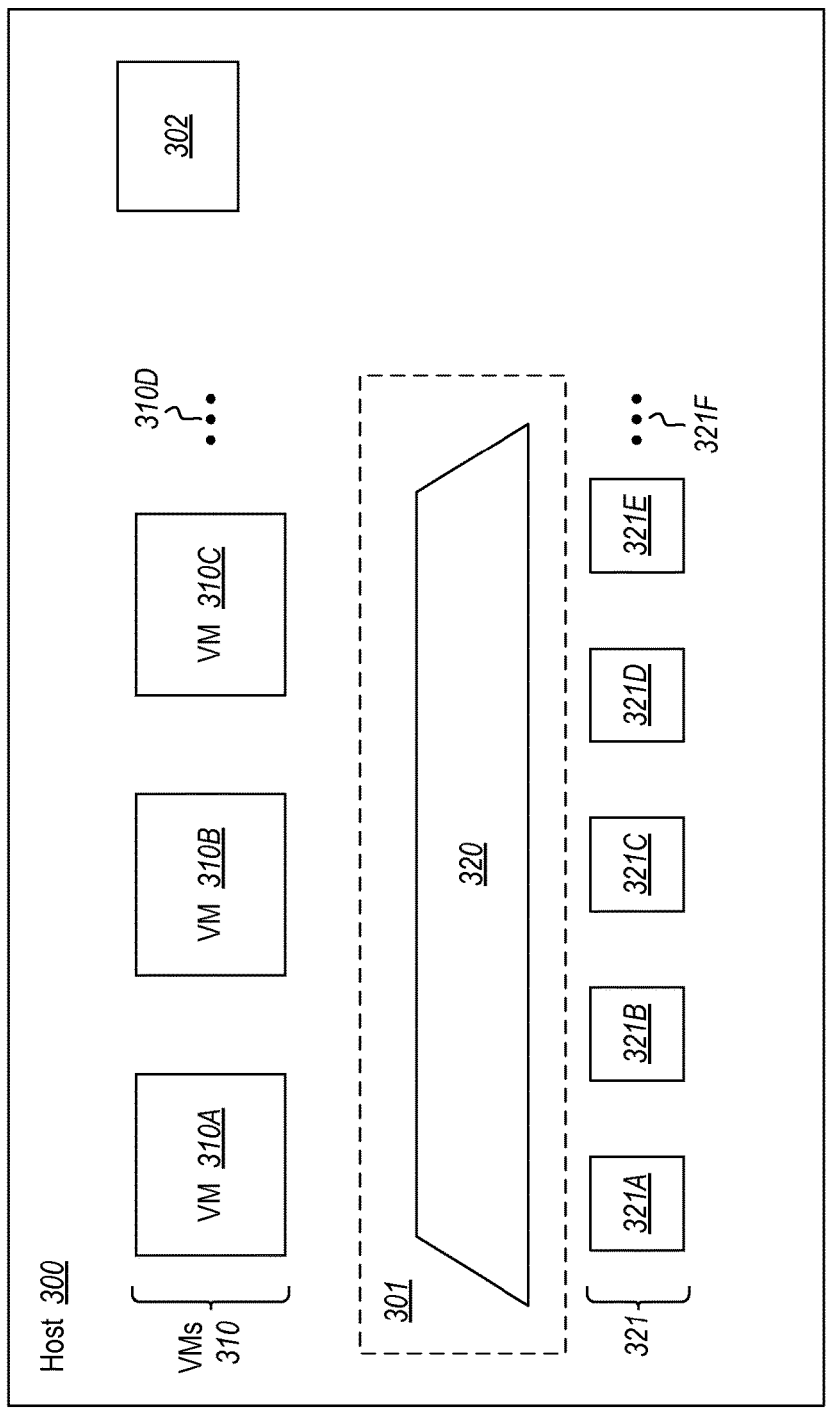
FIG. 3 abstractly illustrates a host computing system that operates a number of virtual machines.

Each host is capable of running one or more, and potentially many, virtual machines. For instance, FIG. 3 abstractly illustrates a host 300 in further detail. As an example, the host 300 might represent any of the hosts 211 of FIG. 2. In the case of FIG. 3, the host 300 is illustrated as operating three virtual machines 310 including virtual machines 310A, 310B and 310C. However, the ellipses 310D once again represents that the principles described herein are not limited to the number of virtual machines running on the host 300. There may be as few as zero virtual machines running on the host with the only upper limit being defined by the physical capabilities of the host 300.

During operation, the virtual machines emulates a fully operational computing system including an at least an operating system, and perhaps one or more other applications as well. Each virtual machine may be assigned to a particular client, and thus be responsible to support the desktop environment for that client. Each virtual machine might alternatively emulate a fully operational computing system that does not render a user interface. For instance, there may be a number of virtual machines that cooperatively interact to perform a distributed application in which each virtual machine performs a role in the application.

The host 300 includes a hypervisor 320 that emulates virtual resources for the virtual machines 310 using physical resources 321 that are abstracted from view of the virtual machines 310. The hypervisor 321 also provides proper isolation between the virtual machines 310. Thus, from the perspective of any given virtual machine, the hypervisor 320 provides the illusion that the virtual machine is interfacing with a physical resource, even though the virtual machine only interfaces with the appearance (e.g., a virtual resource) of a physical resource, and not with a physical resource directly. In FIG. 3, the physical resources 321 are abstractly represented as including resources 321A through 321F. Examples of physical resources 321 including processing capacity, memory, disk space, network bandwidth, media drives, and so forth. The host 300 may operate a host agent 302 that monitors the performance of the host, and performs other operations that manage the host.

Referring back to FIG. 2, the system 200 also includes services 212. In the illustrated example, the services 200 include five distinct services 212A, 212B, 212C, 212D and 212E, although the ellipses 212F represent that the principles described herein are not limited to the number of service in the system 210. A service coordination system 213 (or a "service fabric") communicates with the hosts 211 and with the services 212 to thereby provide services requested by the clients 201, and other services (such as authentication, billing, and so forth) that may be prerequisites for the requested service. The service fabric 213 includes an overallocation policy engine 221, an allocator 222, and a binding engine 223, which may operate as described further below. Alternatively or in addition, one or more of the services 212 may perform some or all of the functions of some or all of the overallocation policy engine 221.

Figure 4:
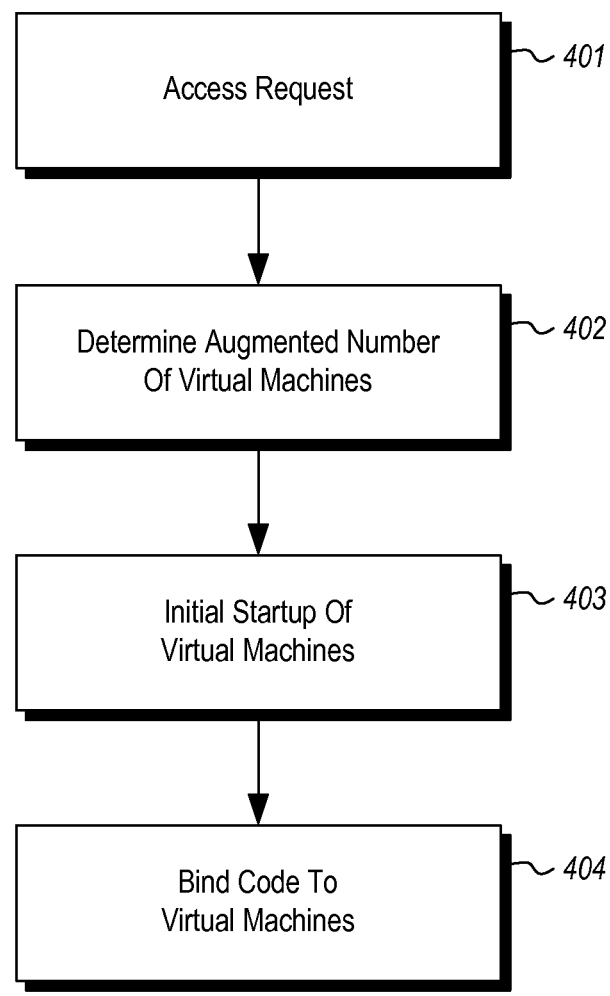
FIG. 4 illustrates a flowchart of a method of starting virtual machines corresponding to an application.

FIG. 4 illustrates a flowchart of a method 400 of starting virtual machines corresponding to an application. The method 400 will be described with frequent reference to the computing environment 200 of FIG. 2, and the host computing system 300 of FIG. 3.

The method 400 is initiated upon accessing a request to allocate a requested number of virtual machines corresponding to an application (act 401). For instance, referring to FIG. 2, the service fabric 213 may receive such a request from one of the clients 201 over the interface 202. The request might specify a number of attributes of the application including how many virtual machines are to be used in the application, as well as attributes of the virtual machines themselves. For instance, for each virtual machine, such attributes might include the size of the virtual machine, the fault domain of the virtual machine, the update domain of the virtual machine, and the code to which the virtual machine is to be bound.

Rather than initiate the startup of only the requested number of virtual machines that are to be ultimately used in the application, the method 400 determines an augmented number of virtual machines to allocate in response to the request (act 402). The augmented number is the sum of the requested number of virtual machines, in addition to a surplus number of virtual machines. For instance, if the requested number of virtual machines is to be 5 total virtual machines, it might be determined that 7 virtual machines are to be started up. Referring to FIG. 2, the overallocation policy engine 221 may determine the surplus number of virtual machines to be started up. The overallocation policy may take into consideration a number of factors including, for instance, a statistical history for time to start up a virtual machine of a particular type, an identity of a requestor, the number of available host computing systems, and percentage of utilization, and so forth. If there is not enough capacity in the datacenter, the number of surplus virtual machines can be reduced, including being fully removed. This avoids failing the customer deployment request of act 401 if there is not enough room to allocate the surplus.

The overallocation engine 221 may determine the number of virtual machines to overallocate depending on an importance of respective roles that are to be performed by the virtual machines. For instance, suppose that a distributed application is to be supported by 100 virtual machines (the example referred to hereinafter as the "primary example"). In this primary example, suppose that there is 1 virtual machine that is to serve in a critical coordination role that would render the application completely ineffective without that virtual machine. Now suppose there are 9 virtual machines in this primary example that are to serve in a role of data interpretation that have a medium level of criticality to the application. Suppose further that there are 90 virtual machines that are to serve as data mining virtual machines in this primary example. If all 90 data mining virtual machines are not operational, then perhaps that might influence the speed at which data is fed to the 9 data interpretation virtual machines, but otherwise, the functionality of the distributed application is not adversely affected.

Thus, in this primary example, there are three roles to be performed, a coordination role, a data interpretation role, and a data mining role. The role to be played by a virtual machine will be determined by the code that is bound to that virtual machine. For instance, a virtual machine to which coordination code is bound performs as a coordination virtual machine. A virtual machine to which data interpretation code is bound performs as a data interpretation virtual machine. A virtual machine to which data mining code is bound performs as a data mining virtual machine.

The overallocation engine 221 may be configured to take such underlying roles into account when determining how many surplus virtual machines to allocate. For instance, for the critical coordination virtual machines, even though only 1 virtual machine is needed, the overallocation engine 221 might allocate three virtual machines. Thus, the ratio of the surplus virtual machines to the requested virtual machines would be 2 to 1 in the case of the coordination virtual machines. For the medium criticality data interpretation virtual machines, even though only 9 virtual machines are needed, the overallocation engine 221 might allocate 15 virtual machines. Thus, the ratio of the surplus virtual machines to the requested virtual machines would be 6 to 9 (or two thirds) in the case of the data interpretation virtual machines. For the less critical data mining virtual machines, even though 90 virtual machines are needed, the overallocation engine 221 might allocate 100 virtual machines. Thus, the ratio of the surplus virtual machines to the requested virtual machines would be 10 to 90 (or one ninth) in the case of the data mining virtual machines.

Thus, the overallocation engine 221 may cause the extent of the overallocation to be determined in response to certain policy that takes into consideration the underlying role to be performed by the virtual machine. For instance, the ratio of the surplus number of the virtual machines to the requested number of the virtual machines may be determined based on a role to be played by at least one of the virtual machines. Such a ratio might be greater the more important or critical the underlying role of the virtual machine.

In some cases, it may be possible to bind different types of code to the same virtual machine. Thus, a particular virtual machine might play different roles depending on which of the multiple types of code is actually bound to the virtual machine. For instance, a virtual machine might be bound to either the coordination code or the data interpretation code if both code requires the same size of virtual machine and have other compatible requirements that allow for either code to be bound to that particular virtual machine. As an example, suppose that the 1 coordination virtual machine is to be 4 gigabytes, and be in a certain fault domain and a certain update domain. Suppose further that the 9 data interpretation virtual machines are also to be of that same size, fault domain and update domain. Then, any virtual machines started up with that size, fault domain, and update domain, may be bound to either the coordination code or the data interpretation code.

In the case in which the same virtual machine may be bound to different code, the overallocation engine 221 might consider each of the multiple possible roles for a particular type of virtual machine in determining how many of those virtual machines to allocate. For instance, suppose that 10 virtual machines of 4 gigabytes size and of the same fault and update domains are needed, 1 for the coordination virtual machine and 9 for the data interpretation virtual machines. The overallocation engine may determine that a surplus of 8 such virtual machines (or 18 virtual machines) is to be allocated. Note this would just be the sum of the individually calculated surpluses for each role (2 for the coordination role and 6 for the data interpretation role). However, the allocation engine 221 may take into consideration more complex calculations to determine the amount of surplus virtual machines to allocate.

Returning to FIG. 4, the method 400 then causes a particular number of virtual machines to initiate startup across a set of one or more host computing systems (act 403). For instance, in the case of FIG. 2, this allocation may be caused by the allocator 222 such that virtual machines are started up across one, some, or all of host computing systems 211. In the case of there not having any virtual machines already prepared, this particular number would be the same as the determined augmented number in act 402. However, there may already be virtual machines started up for reasons stated below, such as from a previous performance of method 400 in response to a previous application request. In that case, the particular number to be started up may be offset by the amount already started up.

For instance, in the primary example, suppose that coordination code may be bound to a one virtual machine of a type generically referred to as "type A" (e.g., a 4 gigabyte virtual machine of a particular fault and update domain), and that data interpretation code may be bound to 9 virtual machines of type A. In that case, the allocation engine 221 might have determined that the augmented number is to be 18 virtual machines of type A. If there are 3 type A virtual machines that are already started up, this act 403 would involve the startup of 15 additional type A virtual machines. Also, suppose that data mining code may be bound to a 90 virtual machines of a type generically referred to as "type B" (e.g., its size, fault domain and/or update domain is different than the type A virtual machines). In that case, the allocation engine 221 might have determined that the augmented number is to be 100 virtual machines of type B. If there are 5 type B virtual machines that are already started up, this act 403 would involve the startup of 95 additional virtual machines.

Note that binding of code to the virtual machines has not happened yet. The virtual machines of type A, and the virtual machines of type B are just initiated to start up. The binding occurs before all of the augmented number of virtual machines are started up. Thus, all virtual machines for the application may be bound to code, before all of the excess virtual machines have completed startup. Since there are often only a few stragglers that tend to take a lot longer than the majority of other virtual machines to start up, this results in a significant latency reduction between the initial request to set up the application, and the availability of the application to the requestor.

Each host agent may monitor startup completion for the various virtual machines on the corresponding host computing system, and provide notifications of completed startups to the binding policy engine 223. For instance, host agent 302 of FIG. 3 may monitor startup progress of virtual machines on the host 300 and report to the binding policy engine 223. In response to these notifications, the binding policy engine 223 binds code to started up virtual machines until the requested number of virtual machines have the appropriate code bound thereto to formulate the application. The binding decisions may be based on policy such as, for example, the criticality of the role, and the compatibility of the virtual machine with the role.

For instance, referring to FIG. 2, and applying the primary example, suppose that host 211A informs binding policy engine 223 that it has started up 1 virtual machine of type A and 40 virtual machines of type B. Since there is only 1 virtual machine of type A available (which could be bound to either coordination code or data interpretation code), and since the coordination role is more critical to the application than the data interpretation role, suppose the binding policy engine 223 binds the coordination code to the single available type A virtual machine. Thus, the binding policy engine 223 may prioritize in time the coordination virtual machine such that code is bound to create the coordination virtual machine before the less critical data interpretation virtual machines are created. Of course, there are not multiple roles competing for virtual machines of type B in the primary example as only data mining code may be bound to the virtual machines of type B in accordance with the customer request. Accordingly, the binding engine 223 may bind data mining code to the 40 virtual machines of type B to create 40 data mining virtual machines.

Suppose further that host 211B subsequently informs binding policy engine that it has started up 11 virtual machines of type A, and 30 virtual machines of type B. The binding policy engine 223 may then allocate data interpretation code to 9 of the virtual machines of type A. In addition, there are now 2 virtual machine of type A that are determined to be excess. Furthermore, the data mining code may be bound to the 30 virtual machines. Now, the highly critical coordination virtual machine is operational. In addition, the medium criticality data interpretation virtual machines are also all operational. Furthermore, 70 out of 90 of the less critical data mining virtual machines are operating. Thus, the application may actually be operational at this point, even though 20 more data mining virtual machines are yet to complete startup.

Now suppose that the host 211C notifies the binding engine 223 that 2 virtual machines of type A and 25 virtual machines of type B have been started up. The additional virtual machines of type A will not have code bound thereto, but may be registered as additional excess virtual machines of type A. Thus, there would now be recognized as being 4 excess virtual machines of type A. The allocation engine would allocate data mining code to 20 of the virtual machines of type B thus completing the 90 requested data mining virtual machines, and the excess 5 virtual machines of type B would be registered. At this point, the binding of code to the virtual machines have been completed (thereby completing act 404), and the application is fully functional for the client. Furthermore, there are 4 excess type A virtual machines that are not bound to any code, and 5 excess type B virtual machines that are not bound to any code.

Note that in this example, there were 18 virtual machines of type A that were initiated startup, and 14 virtual machines of type A have been started up. Thus, 4 virtual machines of type A have not yet finished starting up yet. Furthermore, in this example, there were 100 virtual machines of type B that were initially started up, and 95 virtual machines of type B have been started up. Thus, 5 virtual machines of type B have not yet finished starting up. Yet, even though some of the type A and type B virtual machines are still starting up, the application itself is complete, and may be made available to the requester. Since a small proportion of virtual machines take much longer than the majority (e.g., due to software and/or hardware issues), this means a significant reduction in latency between the time the application was requested, and the time that the application is available for use. As further notifications are received, the service fabric 213 may merely register such virtual machines as available to satisfy subsequent application requests.

Thus, a significant mechanism has been described in which complex applications may be made available more quickly after requesting. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:
   one or more processors; and
   one or more computer-readable hardware storage devices having stored thereon computer-executable instructions that are executable by the one or more processors to cause the computing system to start a plurality of virtual machines corresponding to an application, the computer-executable instructions including instructions that are executable to cause the computing system to perform at least the following:
   access a request to allocate a requested number of virtual machines to an application, for executing a plurality of code portions of the application across the requested virtual machines;
   determine that different sets of virtual machines are to be bound to different code portions of the application corresponding to different roles in the applications, including at least a first role having a first, higher, level of criticality to application functioning, and a second role having a second, lower, level of criticality to application functioning;
   in response to the request, determine a number of virtual machines to allocate to the application, while taking into account the different roles, the number including the sum of:

a first requested number of virtual machines for the first role, plus a first additional number of virtual machines for the first role, wherein the first additional number is determined based on applying a first, higher, ratio identified based on the first, higher, level of criticality and;

a second requested number of virtual machines for the second role, plus a second additional number of virtual machines for the second role, wherein the second additional number is determined based on applying a second, lower, ratio identified based on the second, lower, level of criticality;

in response to the request, and prior to binding any code of the application to any of the requested virtual machines, allocate the determined number of virtual machines to the application, including causing a particular number of virtual machines to initiate start up across a set of one or more host computing systems, such that a sum of the particular number of virtual machines and any already started up virtual machines at the set of one or more host computing systems that are available for allocation to the application equals the determined number of virtual machines; and after causing the particular number of virtual machines to initiate start up, and before all of the particular number of virtual machines have completed starting up, bind at least one of the one or more code portions to one or more of the allocated virtual machines that have completed starting up.

2. The computer system in accordance with claim 1, wherein the binding of code is performed by a binding engine that prioritizes binding of code to virtual machines according to which role that each virtual machine is to perform in the application.

3. The computer system in accordance with claim 1, wherein the binding of code comprises:

binding a first code portion to the first set of one or more virtual machines, to cause each of the virtual machines in the first set to perform the first role in the application; and binding a second code portion to the second set of one or more virtual machines, to cause each of the virtual machines in the second set to perform the second role in the application.

4. The computer system in accordance with claim 3, wherein the binding of the first code portion and the binding of the second code portion are prioritized based on the first level of criticality and the second level of criticality.

5. The computer system in accordance with claim 1, wherein the requested number of virtual machines for the application includes a requested number of virtual machines of a first type and a requested number of virtual machines of a second type, and wherein the computer-executable instructions also include instructions that are executable to cause the computing system to perform at least the following:

determine a number of virtual machines of the second type to allocate in response to the request, the number of virtual machines of the second type including a sum of the requested number of virtual machines of the second type in addition to an additional number of virtual machines of the second type;

cause the number of virtual machines of the second type to initiate start up across the set of one or more host computing systems; and after causing the number of virtual machines of the second type to initiate start up, and before all of the number of virtual machines of the second type are started up, bind code to started up virtual machines of the second type equal to the requested number of virtual machines of the second type.

6. The computer system in accordance with claim 5, wherein the binding of code to started up virtual machines of the second type is completed at a different time for at least one of the virtual machines of the second type than the binding of code to started up virtual machines of the first type for at least one of the virtual machines of the first type.

7. The computer system in accordance with claim 5, wherein the computer-executable instructions also include instructions that are executable to cause the computing system to perform at least the following:

determine a number of virtual machines of a third type to allocate in response to the request, the number of virtual machines of the third type including a sum of the requested number of virtual machines of the third type in addition to an additional number of virtual machines of the third type;

cause the augmented number of virtual machines of the third type to initiate start up across the set of one or more host computing systems; and after causing the augmented number of virtual machines of the third type to initiate start up, and before all of the augmented number of virtual machines of the third type are started up, bind code to started up virtual machines of the third type equal to the requested number of virtual machines of the third type.

8. The computer system in accordance with claim 5, wherein all of the virtual machines of the first type are the same size.

9. The computer system in accordance with claim 5, wherein all of the virtual machines of the first type are bindable to in a common fault domain.

10. The computer system in accordance with claim 5, wherein all of the virtual machines of the first type are bindable to in a common update domain.

11. A method, implemented at a computer system that includes one or more processors, of starting a plurality of virtual machines corresponding to an application, the method comprising:

accessing a request to allocate a requested number of virtual machines to an application, for executing a plurality of code portions of the application across the requested virtual machines;

determining that different sets of virtual machines are to be bound to different code portions of the application corresponding to different roles of the application, including at least a first role having a first, higher, level of criticality to application functioning, and a second role having a second, lower, level of criticality to make the application functioning;

in response to the request, determining a number of virtual machines to allocate to the application, while taking into account the different roles, the number including the sum of:

a first requested number of virtual machines for the first role, plus a first additional number of virtual machines for the first role, the first additional number being determined based on applying a first, higher, ratio identified based on the first, higher, level of criticality; and a second requested number of virtual machines for the second role, plus a second additional number of virtual machines for the second role, the second additional number being determined based on applying a second, lower, ratio identified based on the second, lower, level of criticality;

in response to the request, and prior to binding any code of the application to any of the requested virtual machines, allocating the determined number of virtual machines to the application, including causing the augmented number of virtual machines to initiate start up across a set of one or more host computing systems; and after causing the determined number of virtual machines to initiate start up, and before all of the determined number of virtual machines have competed starting up, binding at least one of the one or more code portions to one or more of the allocated virtual machines that have completed starting up.

12. The method in accordance with claim 11, wherein the method is performed in a cloud computing environment by a service fabric that is connected to a plurality of host computing systems including the set of one or more host computing systems.

13. The method in accordance with claim 11, wherein the binding of code is performed by prioritizing in time the binding of code to virtual machines according to which role that each virtual machine is to perform in the application.

14. The method in accordance with claim 11, wherein the requested number of virtual machines for the application includes a requested number of virtual machines of a first type and a requested number of virtual machines of a second type, the method further comprising:

determining a number of virtual machines of the second type to allocate in response to the request, the number of virtual machines of the second type including a sum of the requested number of virtual machines of the second type in addition to an additional number of virtual machines of the second type;

causing the determined number of virtual machines of the second type to initiate start up across the set of one or more host computing systems; and after causing the determined number of virtual machines of the second type to initiate start up, and before all of the determined number of virtual machines of the second type are started up, binding code to started up virtual machines of the second type equal to the requested number of virtual machines of the second type.

15. The method in accordance with claim 11, further comprising:

detecting one or more excess virtual machines of the number of virtual machines that are started up beyond the requested number of virtual machines.

16. The method in accordance with claim 15, wherein the request is a first request, and the application is a first application, the method further comprising:

accessing a second request to run a second application; and using the detected excess one or more virtual machines that were initially started up in response to the first request to instead operate a role in the second application.

17. A computer program product comprising one or more computer-readable hardware storage devices having stored thereon computer-executable instructions that are executable by one or more hardware processors of a computer system to cause the computer system to start a plurality of virtual machines corresponding to an application, the computer-executable instructions including instructions that are executable to cause the computing system to perform at least the following:

receive a request to allocate a requested number of virtual machines to an application, for executing a plurality of code portions of the application across the requested virtual machines;

determine that different sets of virtual machines are to be bound to different code portions of the application corresponding to different roles of the application, including at least a first role having a first, higher, level of criticality to application functioning, and a second role having a second, lower, level of criticality to application functioning;

based on attributes of the application, calculate a number of virtual machines to allocate to the application, while taking into account the first and second roles, the number including the sum of:

a first requested number of virtual machines for the first role, plus a first additional number of virtual machines for the first role, wherein the first additional number is determined based on applying a first, higher, ratio identified based on the first, higher, level of criticality; and a second requested number of virtual machines for the second role, plus a second additional number of virtual machines for the second role, wherein the second additional number is determined based on applying a second, lower, ratio identified based on the second, lower, level of criticality;

prior to binding any code of the application to any of the requested virtual machines, allocating the calculated number of virtual machines to the application, including causing the calculated number of virtual machines to initiate start up across a set of one or more host computing systems; and after causing the calculated number of virtual machines to initiate start up, and before all of the calculated number of virtual machines have competed starting up, binding at least one of the one or more code portions to one or more of the allocated virtual machines that have completed starting up.

18. The computer program product in accordance with claim 17, wherein the binding of code is performed by prioritizing in time the binding of code to virtual machines according to which role that each virtual machine is to perform in the application.

19. The computer program product in accordance with claim 18, wherein the binding of code comprises:

binding a first code portion to the first set of one or more virtual machines, to cause each of the virtual machines in the first set to perform the first role in the application; and binding a second code portion to the second set of one or more virtual machines, to cause each of the virtual machines in the second set to perform the second role in the application.

* * * * *